March 30, 1954  J. B. GETZ  2,673,578
MACHINE FOR MAKING BARBED WIRE
Filed Feb. 26, 1949  10 Sheets-Sheet 1
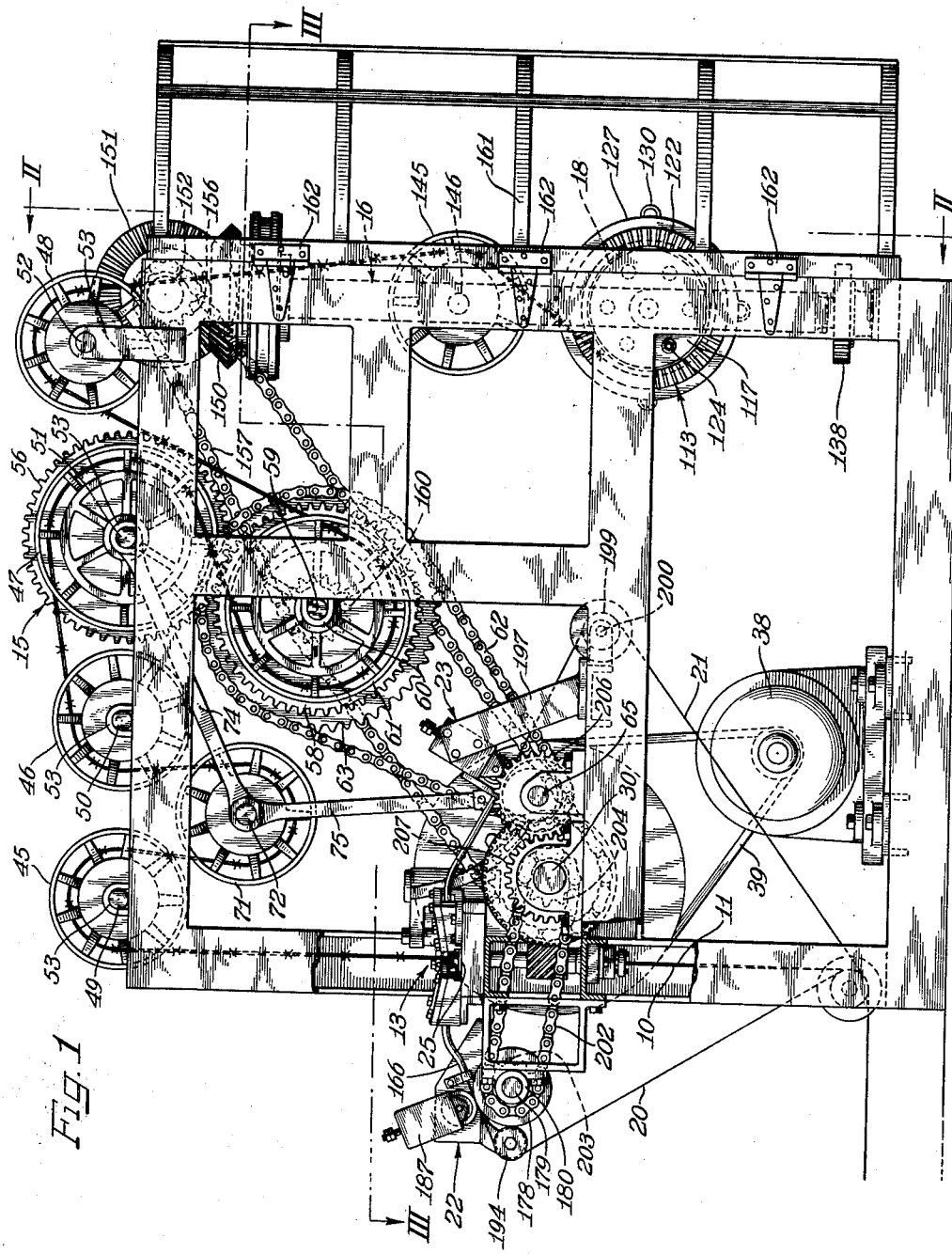
Inventor
John B. Getz
by The Firm of Charles W. Hills  Attys

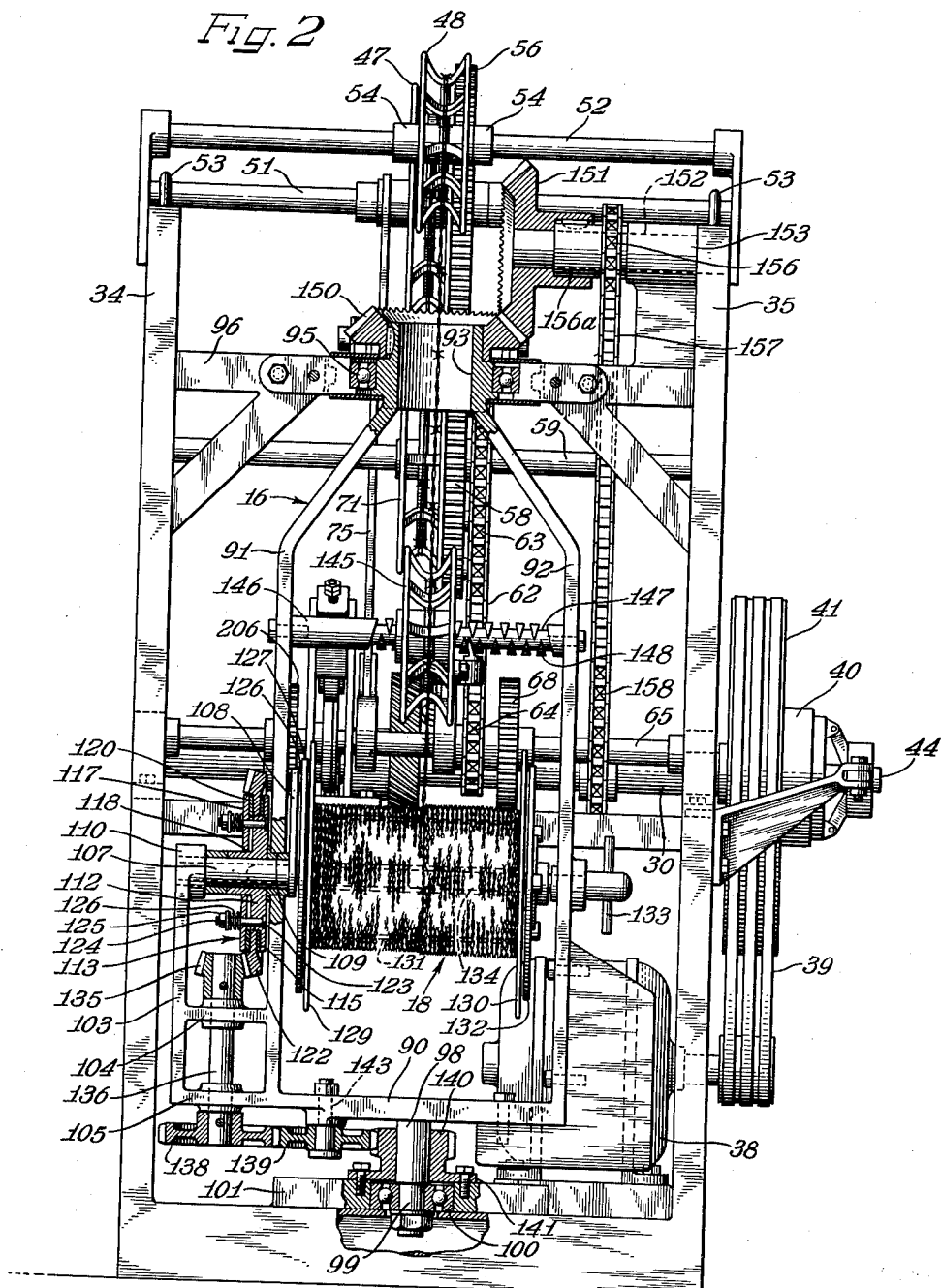

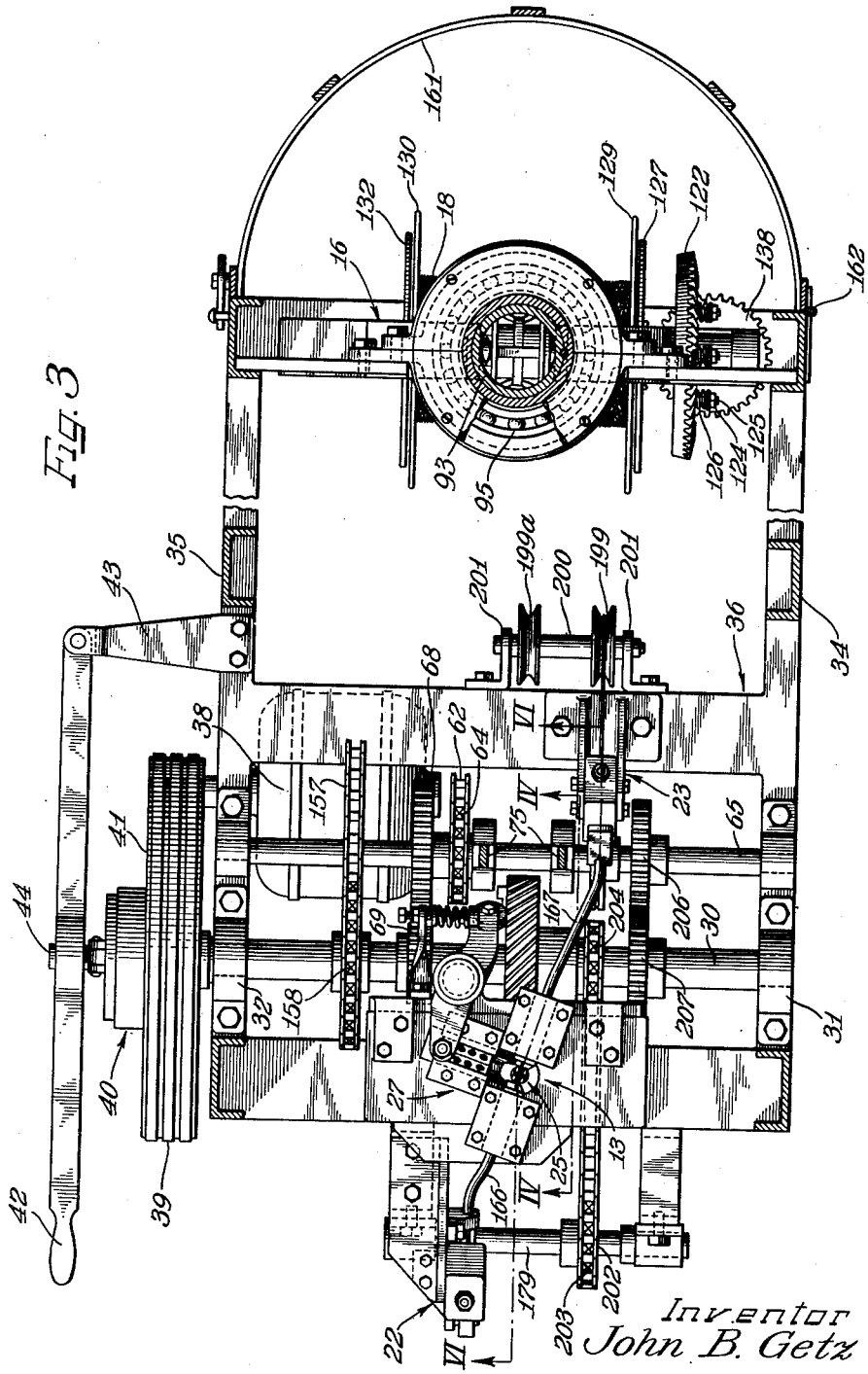

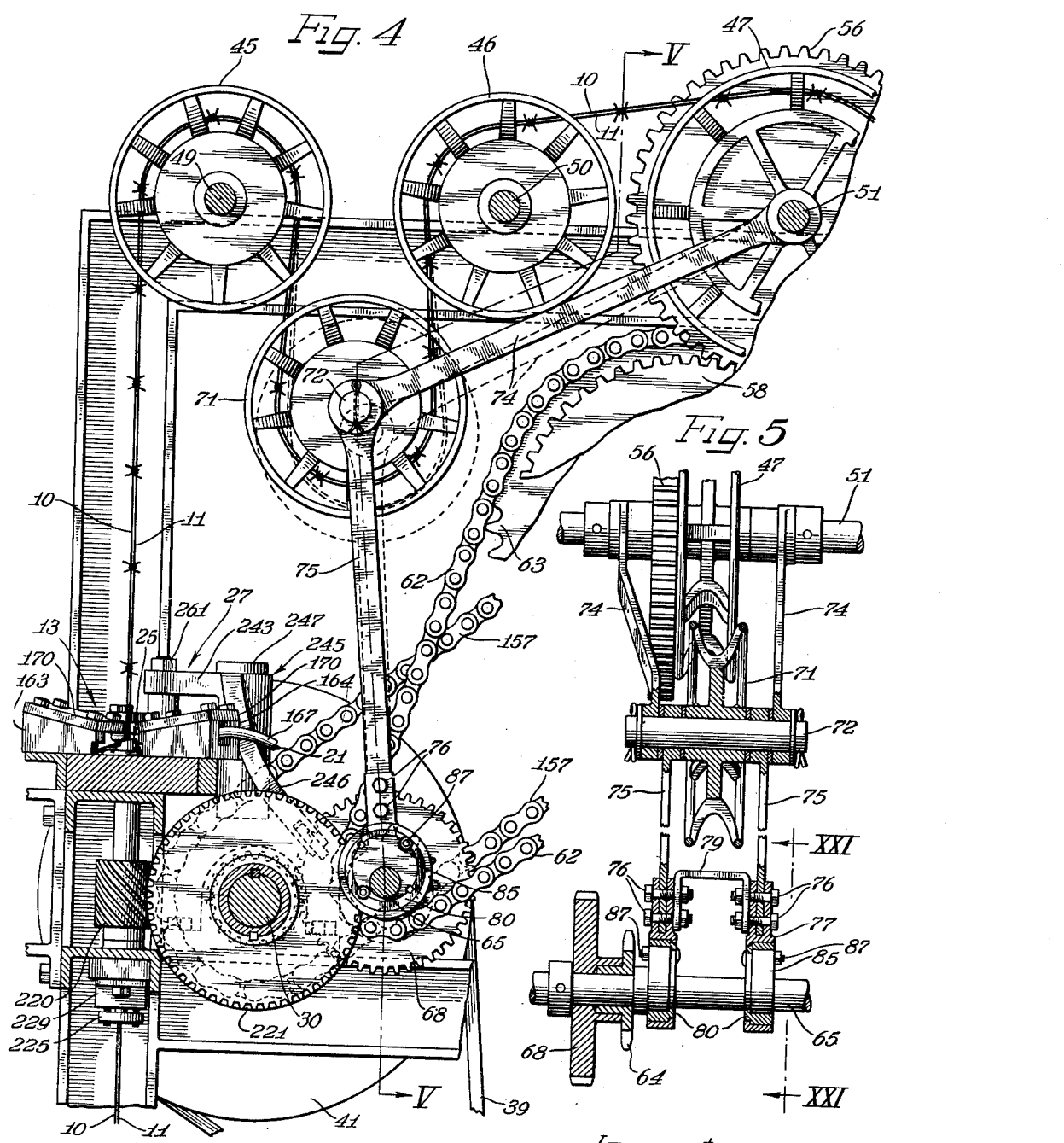

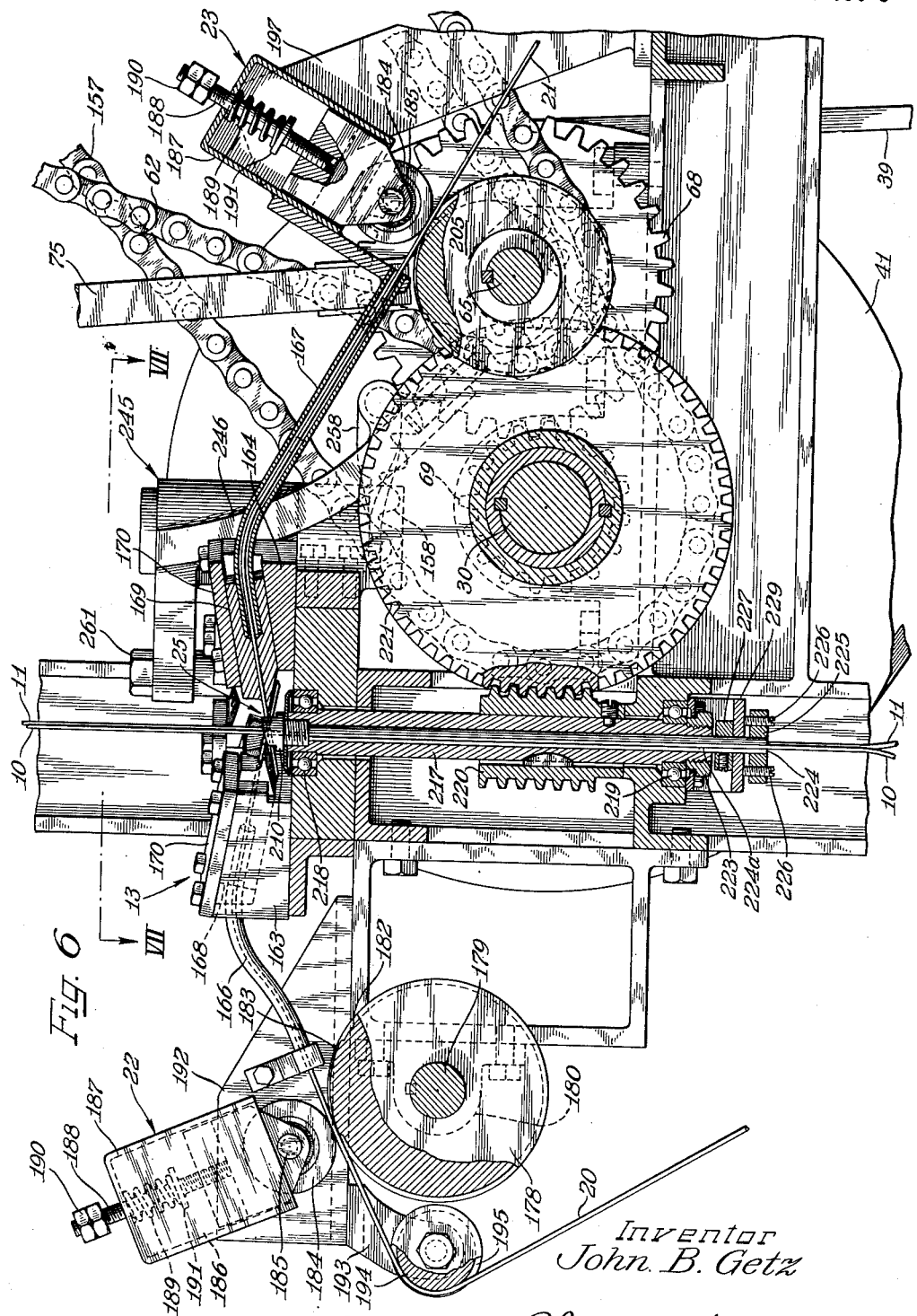

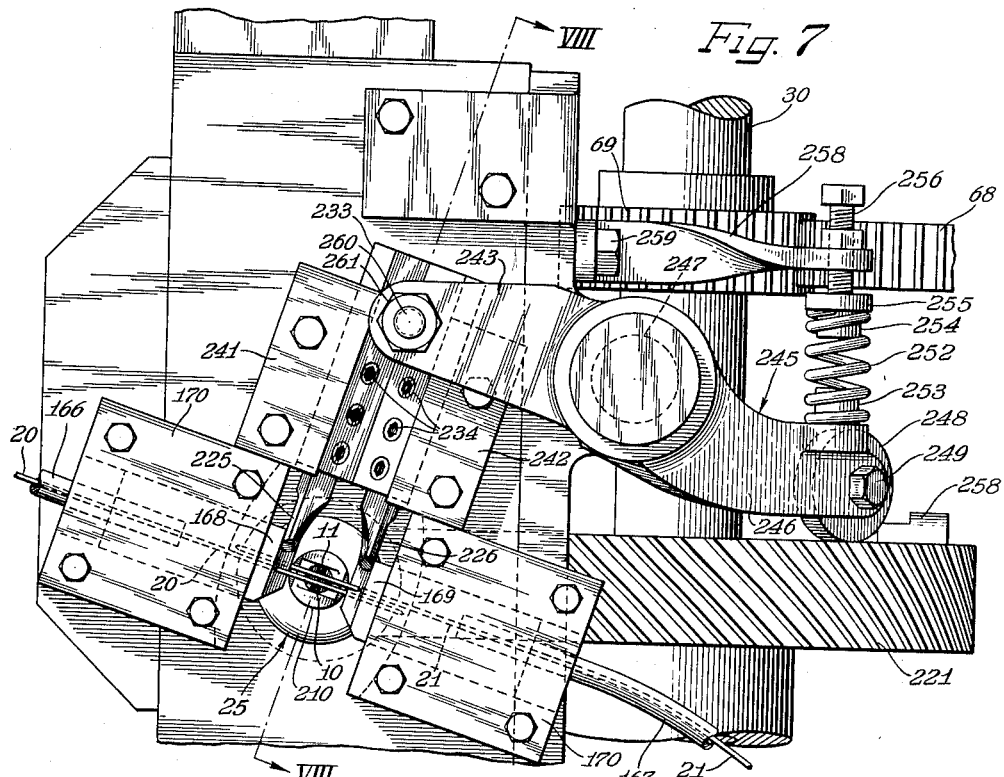
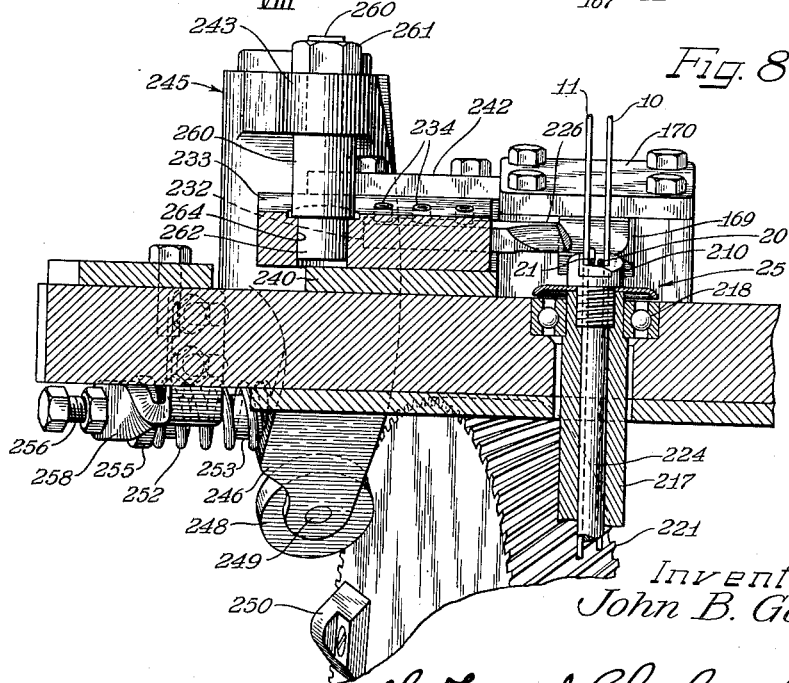

March 30, 1954   J. B. GETZ   2,673,578
MACHINE FOR MAKING BARBED WIRE
Filed Feb. 26, 1949   10 Sheets-Sheet 7
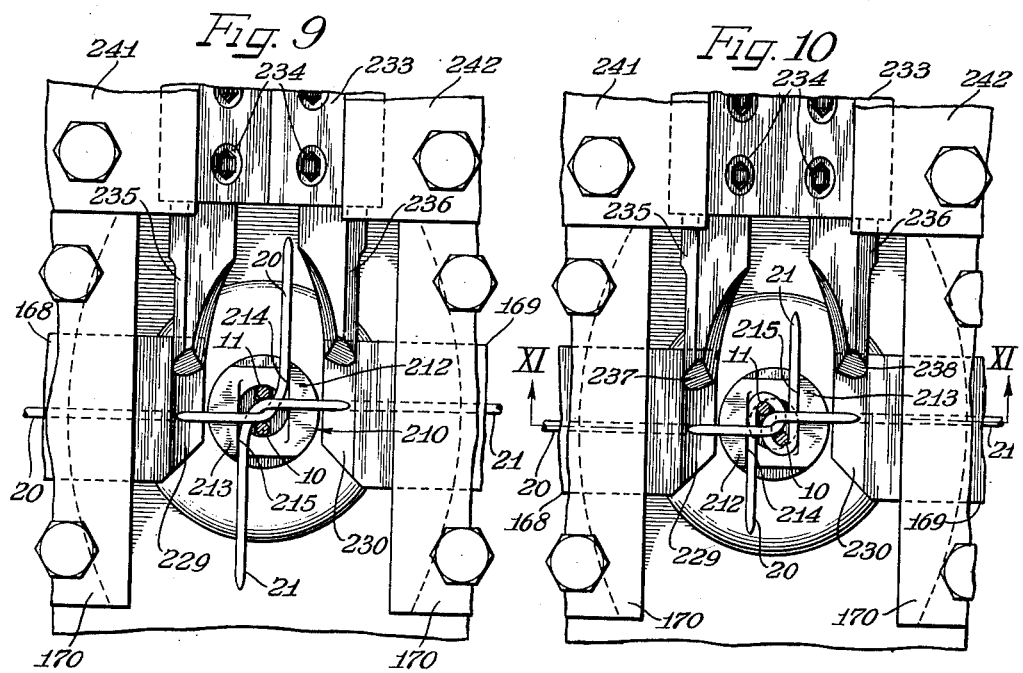
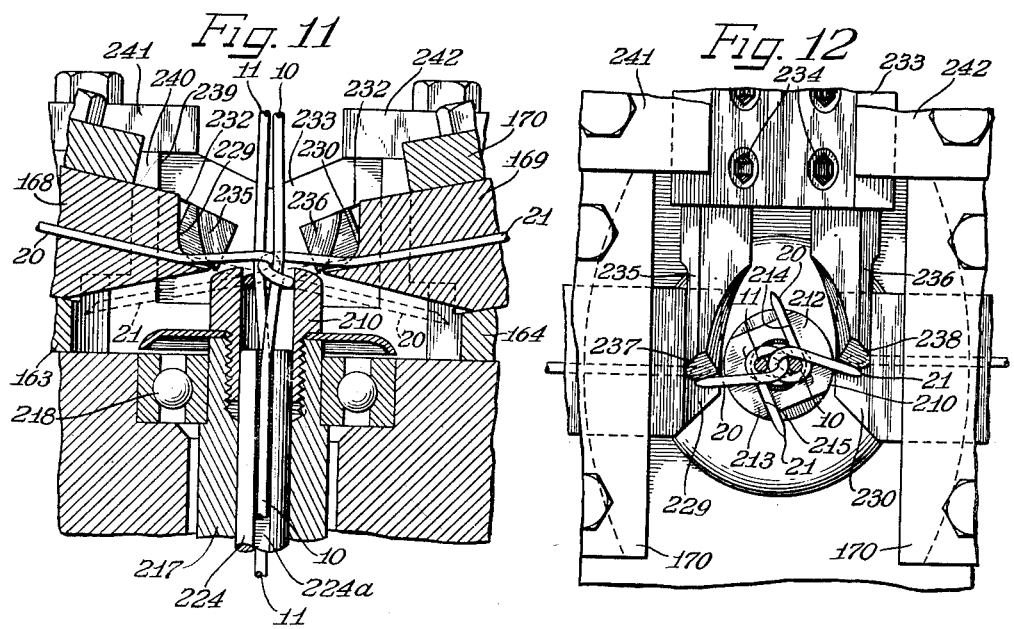
Inventor
John B. Getz
by The Firm of Charlesworth
Attys March 30, 1954  J. B. GETZ  2,673,578
MACHINE FOR MAKING BARBED WIRE
Filed Feb. 26, 1949  10 Sheets-Sheet 8

Inventor
John B. Getz
by The Firm of Charles W. Hills Attys

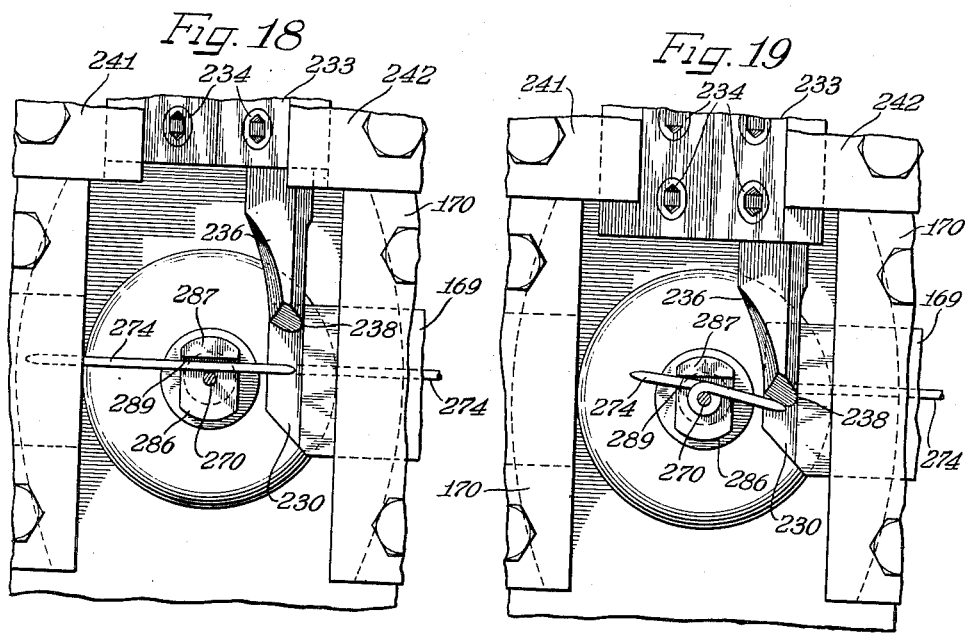
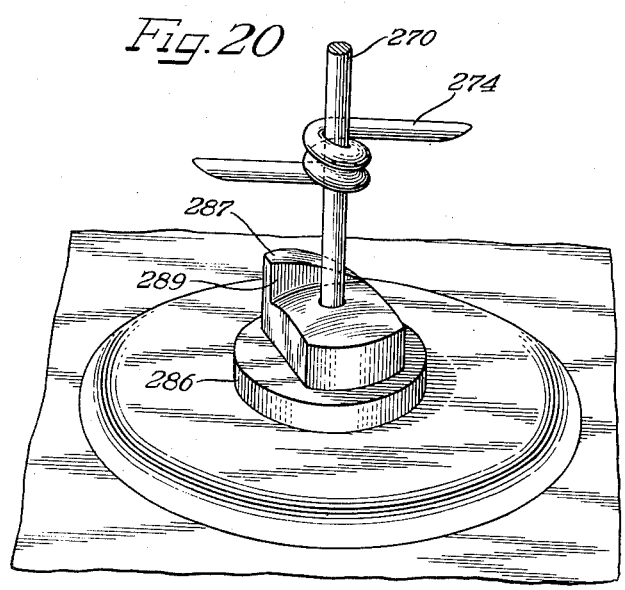
Inventor
John B. Getz

March 30, 1954
J. B. GETZ
2,673,578
MACHINE FOR MAKING BARBED WIRE
Filed Feb. 26, 1949
10 Sheets-Sheet 10
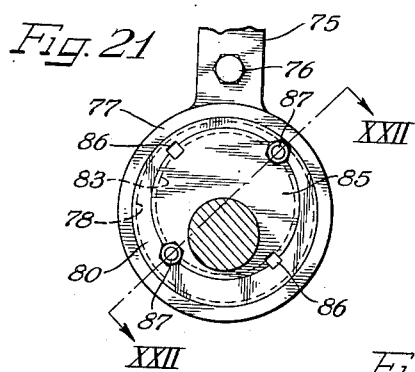
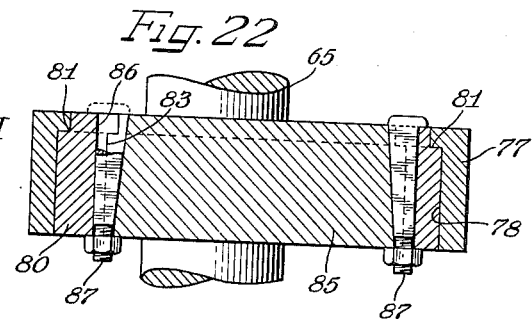
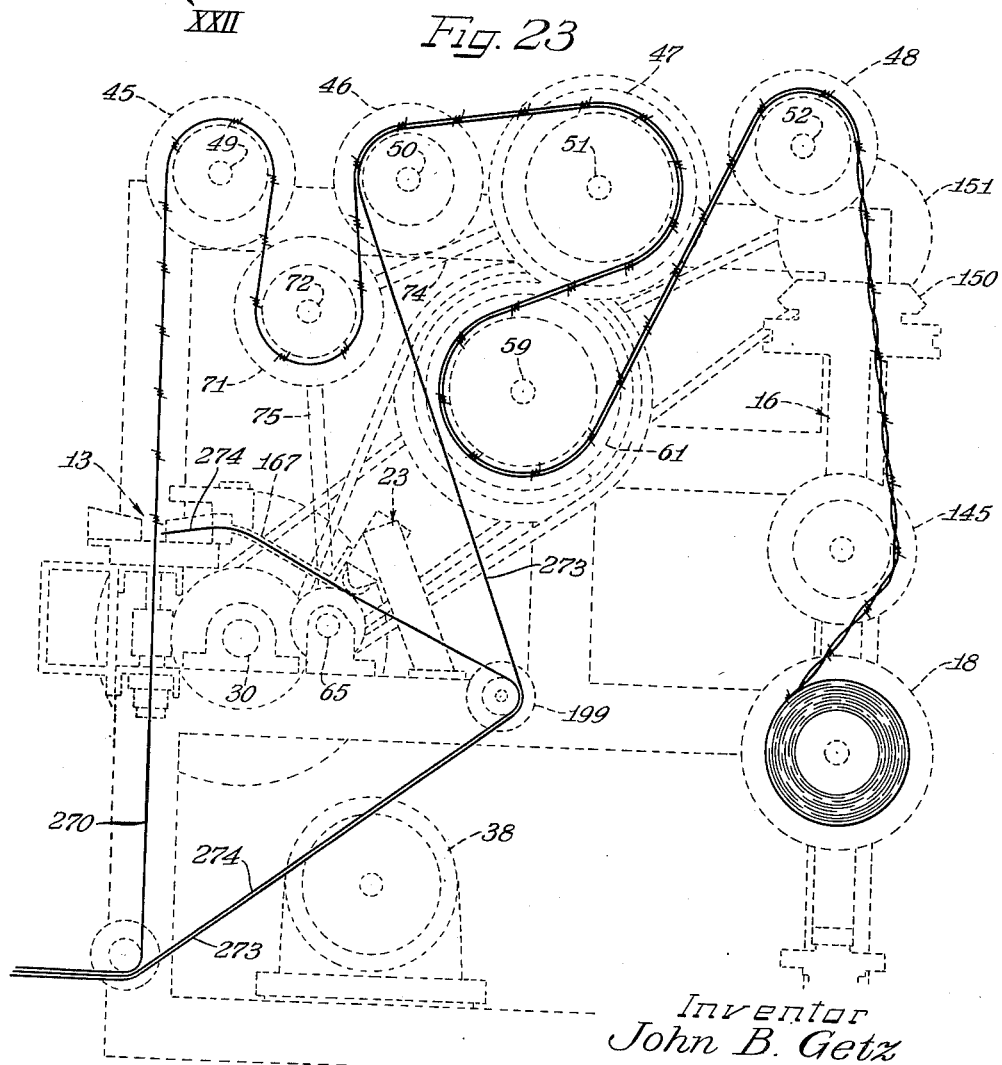
Inventor
John B. Getz
by The Firm of Charles W. Hills Attys Patented Mar. 30, 1954

2,673,578

UNITED STATES PATENT OFFICE 2,673,578

MACHINE FOR MAKING BARBED WIRE

John B. Getz, Morton, Ill., assignor to Interlocking Fence Company, Morton, Ill., a corporation of Illinois Application February 26, 1949, Serial No. 78,627

3 Claims. (Cl. 140—60)

This invention relates to a machine for making barbed wire. More particularly, it has to do with a barbed wire making machine that is arranged to automatically carry out the complete operation of making barbed wire from the introduction of separate strands of wire into the machine to remove a coil of barbed wire therefrom.

Heretofore, barbed wire had been made in machines wherein the barbs are attached to wire that travels in a substantially horizontal direction. A plurality of cams control the various cutting and bending operations of these machines. However, a horizontal type machine takes up a considerable amount of valuable floor space and, due to the disposition of the structure, the working parts of the machine are positioned in inaccessible places making repair and maintenance an expensive problem.

The removal of the wire after it has been formed and wound on a spool has always presented a difficult problem. The barber wire making machines being used at present wind the wire on a spool which is secured at the lower end of the machine requiring that the operator crawl partially under the machine to release the spool. This procedure is not only dangerous for the operator but is also a very inefficient method of releasing the spool.

Another deficiency inherent in the present machines is their inability to effectively bring the barbs and the carrier wires together in a manner so that the barbs may be accurately attached to the wires. Thus, most machines "spit" many barbs and secure the barbs at unequal spaces on the carrier wire. Thus, many barbs are wasted and the finished barbed wire often has unequally spaced barbs.

Finally, hitherto there has been no efficient or accurate way of calculating the length of the wire wound on the spool. Thus, the weight of various spools, when ready for delivery to the customer, vary as much as ten pounds. Under these conditions it is very difficult to calculate the expense of producing a spool of wire.

According to the features of the present invention, barbs are secured on a carrier wire as it is positively drawn in a vertical direction through the machine. A novel rotating twister head engages an auxiliary barb-forming wire that is positively fed transversely of the carrier wire and twisted around the carrier wire just prior to being severed by automatically controlled cutting blades. The positive movement of both the carrier wire and the auxiliary wire assures the tight securement of the barbs to the wire and cause equal spacing of the barbs on the wire.

It is therefore an important object of the present invention to provide an automatic machine for making barbed wire which is simple and efficient in operation.

Another object of this invention is to provide a novel means for positively moving a wire through the various forming operations of the machine.

A further object of this invention is to provide novel means for feeding an auxiliary wire to the barb-attaching station of the machine for the bending and cutting of barbs therefrom.

A further object of this invention is to provide an improved twister head for bending the barbs around the carrier wire.

A still further object of this invention is to provide a novel barbed wire forming machine which may be quickly and efficiently changed from a machine for producing two-point barbs to a machine for producing four-point barbs.

Another and further object of this invention is to provide a barbed wire machine in which the wire is automatically wound on a spool disposed at a point convenient to the reach of the operator.

Another important object of this invention is to provide a barbed wire machine having a rigid construction which substantially eliminates vibration of the machine during operation.

It is an object of this invention to provide an upright barbed wire forming machine occupying small floor space.

A further object of this invention is to provide a barbed wire forming machine in which all working parts are readily accessible for inspection, maintenance and repair.

A still further object is to provide a novel twister head of simple construction wherein many parts used heretofore have been eliminated.

Another object of this invention is to provide a barbed wire forming machine featuring a one-lip twister head.

Another object of this invention is to provide a novel method of forming barbed wire.

An important object is to provide a barbed wire forming machine that will accurately secure barbs at regular intervals on a carrier wire.

A still further object is to provide a novel barbed wire forming machine that throws or spits but a negligible number of barbs, if any, thereby providing uniform wire at less cost than heretofore possible.

A feature of this invention resides in the provision of a machine that measures the finished wire accurately so that spools of finished wire will all be of a constant weight within very close limits, thus adding to economy of production.

Another feature of this machine is the provision of a simplified and efficient construction utilizing a friction clutch in association with the winding reel.

An important feature of this machine is the provision of means for selectively varying the spacing of the barbs on the carrier wire.

Other and further features, advantages and objects of the present invention will become apparent to those skilled in the art from the following detailed description taken in connection with the annexed sheet of drawings.

As shown on the drawings:

Figure 1 is a side elevational view of a barbed wire making machine constructed according to the teachings of the present invention;

Figure 2 is a vertical sectional view taken substantially on line II—II of Figure 1 looking in the direction indicated by the arrows;

Figure 3 is a fragmentary horizontal sectional view taken on line III—III of Figure 1;

Figure 4 is a fragmentary vertical sectional view taken substantially on line IV—IV of Figure 3;

Figure 5 is a fragmentary vertical sectional view taken on line V—V of Figure 4;

Figure 6 is a fragmentary vertical sectional view taken substantially on line VI—VI of Figure 3;

Figure 7 is a fragmentary horizontal view taken on line VII—VII of Figure 6;

Figure 8 is an enlarged first fragmentary vertical sectional view taken on line VIII—VIII of Figure 7;

Figure 9 is a fragmentary enlarged plan view of a portion of the barb-attaching station of the machine constructed according to the present invention as shown in Figure 7;

Figure 10 is a fragmentary plan view similar to Figure 9 showing the barbs in a bent position;

Figure 11 is a fragmentary vertical sectional view taken on line XI—XI of Figure 10;

Figure 12 is a fragmentary plan view similar to Figures 9 and 10 showing the barbs in a further twisted position;

Figure 18 is a fragmentary plan view of the barb attaching station of the barbed wire making machine of the present invention showing the machine as arranged to make a two-point barb;

Figure 19 is a fragmentary plan view similar to Figure 18 showing the barb in a twisted condition;

Figure 20 is a fragmentary perspective view of a two-point barbed wire as it is being drawn away from the barb-attaching station of the machine;

Figure 21 is a fragmentary vertical sectional view taken on line XXI—XXI of Figure 5;

Figure 22 is a fragmentary sectional view taken on line XXII—XXII of Figure 21; and Figure 23 is a diagrammatic showing of the barbed wire making machine of the present invention as adapted for making two-point barbs and showing in solid lines the path of the wire as it is processed through the machine.

As shown on the drawings:

Figure 13:
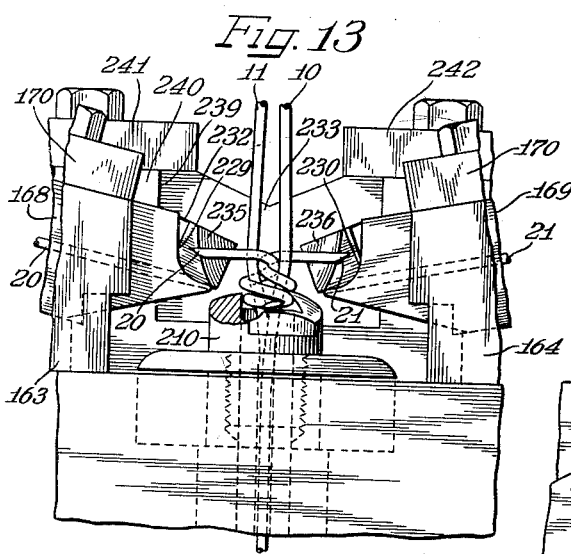
Figure 13 is a fragmentary elevational view of the barb-attaching station shown in Figures 9, 10, 11 and 12 but showing the wires after the barb had been severed from the auxiliary wire.

In Figures 1, 2 and 3 a machine constructed according to the teachings of this invention is illustrated as arranged to make a four-point barbed wire. A pair of carrier wires 10 and 11 are drawn substantially vertically through a barb-attaching station 13 by means of a power-driven gear mechanism 15. After passing through the barb-attaching station 13, the wires are directed over a series of idler wheels and through a cage 16, Figure 2, where they are twisted around each other and wrapped onto a storage drum 18.

Separate strands of barb-forming wire 20 and 21 are positively drawn by drive mechanisms 22 and 23, respectively, from a supply source and pushed between the vertical strands 10 and 11 at the barb-attaching station 13 where a twister head assembly 25 wraps the strands 20 and 21 around the strands 10 and 11, and a cutter assembly 27 severs the strands 20 and 21 at convenient lengths to form barbs.

*Mechanism for drawing the strands 10 and 11 through the machine*

The main timing shaft 30 is journaled in pillow blocks 31 and 32 on side structural members 34 and 35 of a supporting frame structure 36. The shaft 30 is driven from a motor 38 through a V-belt drive 39. A friction clutch 40 manually operated through a lever 42 is arranged to connect the pulley 41, around which the V-belt is trained, into driving contact with the main timing shaft 30.

As is shown in Figure 3, the lever 42 may be pivotally connected at its end to an arm 43 secured to the structural member 35 and be provided substantially between its end portions with a pin 44 which is pivotally connected to the clutch assembly 40.

A plurality of guide pulleys 45, 46, 47 and 48 are disposed for free rotation on shafts 49, 50, 51 and 52, respectively, which are secured at their end portions by straps 53 to the side frame members 34 and 35. These guide pulleys are located substantially intermediate the side members 34 and 35 of the frame structure and are retained against sidewise or lateral movement by means of sleeves 54 (Figure 2) which are keyed or pinned to the associated shaft. The guide pulleys 45, 46, 47 and 48 have an open frame construction which substantially eliminates bending of the barbs as the wire is directed over the wheels and provides arms which have surfaces against which the barbs will abut for aiding the rotation of the wheels and the movement of the barbed wires through the machine. The wheels have a substantially V-shaped groove which receives the barbed wire therein.

A large gear 56 is secured, by any suitable means, to one side of the guide pulley 47 for rotation therewith on the shaft 51. This gear 56 is in mesh with a gear 58 which is disposed for free rotation on a shaft 59 which is secured by straps 60 to upright portions of the side frame members 34 and 35. The gear 58 is secured to a pulley 61 and a sprocket 63 driven by a chain 62 also trained around a sprocket 64 that is journalled for free rotation on a timing shaft 65. The sprocket 64 is secured to the hub of a gear 68 also freely rotatable on the shaft 65 and in mesh with a gear 69 keyed to the main timing shaft 30.

Thus, the guide pulley 47 is rotated through the gears 56 and 58, the sprockets 63 and 64, and the gears 68 and 69 from the main timing shaft 30. It will, of course, be understood that the guide wheels 45 and 46, being freely journalled on their respective shafts, are rotated by the contact of the barbed wire as it passes thereover. It is to be noted that the wire is in friction contact with approximately half of each of the driven pulleys 47 and 61. This frictional engagement, plus the abutting contact of the barbs with the arms of the pulleys, provide the force for pulling the wire through the barb-attaching station 13.

An indexing pulley or pull-up wheel 71 is journalled for free rotation on a shaft 72 which is pivotally connected on either side of the wheel 71 to pivoting arms 74 and 75 (Figure 5). The arms 74 are also pivotally mounted on the shaft 51, while the arms 75 are secured by bolts 76 to an eye end member 77. The arms 75 are held in spaced relation by a bracket 79 which is secured therebetween at the point where the eye ends 77 are connected to the arms 75. As best seen in Figure 21, the end member 77 has a uniform circular opening 78 therein. An adjusting sleeve member 80 is disposed in the opening 78 and rests on a shoulder portion 81 (Figure 5) of the eye end member 77. The sleeve has an opening 83 therein which is located eccentrically with relation to the opening 78 so that the inner wall of the sleeve defines an eccentric camming surface. The shaft 65 has two hub portions 85 which are eccentrically mounted on the shaft and are disposed in the opening 83 of the adjusting sleeve 80. Square holes 86 are cut into the members 85 and 80 at their abutting peripheral portion. These square holes, which are arranged to receive locking bolts 87, are disposed at 90° intervals around the eccentric surfaces with one hole being disposed at the point of minimum eccentricity of the sleeve 80. By loosening the bolts 87 and withdrawing them from the holes and then revolving the member 85 through 90°, a different adjustment of the throw of the rods 75 may be obtained. Thus, three adjustable positions are available, that of minimum throw, an intermediate throw, and a maximum throw without any substitution of parts. When the bolts 87 are secured in place the eccentric end portion acts as a unit revolving eccentrically about the shaft 65, and thus the arms 75 are reciprocated in a substantially vertical direction to raise and lower the indexing pulley 71. The adjusting effect of the bolts 87, of course, regulates the amount which the wheel 71 is moved in the vertical direction.

As seen in Figure 1, the carrier wires 10 and 11 are directed vertically through the barb-attaching station 13 and then consecutively over the guide pulleys 45, 71, 46, 47, 61 and 48. Since the guide wheels 61 and 47 are positively rotated, the wire disposed in the grooves in these wheels will frictionally engage these wheels or will abut the arm members of the open construction of the wheels and draw the strands of wire along over the guide pulleys 46, 71 and 45. It is to be particularly noted that the pulleys 61 and 57 are positively rotated all during the operation of the motor and that the arms 75 are actuated in a vertical direction by the eccentric which is disposed about the shaft 65 which is also in the drive assembly. Thus, there is a definite timed coordination between the movement of the wires over the guide pulleys and the vertical actuation of the guide wheels 71.

Periodically the guide wheel 71 is pulled downwardly by the eccentric mechanism thus causing the strands of wire 10 and 11 to be pulled upwardly out of the barb-attaching station 13 a definite distance depending upon the setting of the eccentric mechanism. It is to be noted that the driving guide wheels 47 and 61 are rotating as the indexing wheel 71 moves downwardly, and therefore the wires 10 and 11 will be indexed rapidly due to the double feeding effect. When the pulley 71 moves upwardly, the feeding effect of the pulleys 47 and 61 will take up the loop of wire which the downward movement of the pulley 71 has formed. Thus, in effect, the strands of wire 10 and 11 between the barb-attaching station 13 and the guide pulley 45 remain stationary except when the guide pulley 71 is pulled downwardly to index the strands 10 and 11 a predetermined distance away from the barb-attaching station. It will, of course, be understood that the downward and upward movement of the guide pulley 71 may be so regulated with respect to the feeding action of the pulleys 47 and 61 that the strands of wire will be in contact with the base of the pulley groove during the upward movement of the pulley 71.

It will be readily recognized that this apparatus provides a positive means for measuring the amount of wire that is formed in this machine since the guide pulley 71 has a definite stroke and is actuated a definite number of times per minute. Thus, by merely counting the number of times the wheel 71 is actuated, the exact amount of wire wound around the storage drum can be accurately ascertained.

*Mechanism for rotating the cage 16 to twist the barbed wire strands*

At the right end of the machine, as seen in Figure 1, a cage 16 is supported between the side structural members 34 and 35. This cage comprises a substantially U-shaped frame which has a lower base strap 90 (Figure 2) and two side straps 91 and 92 integrally formed. At the upper end, the side straps 91 and 92 converge to form a hollow cylindrical portion 93. This portion 93 is rotatably mounted on bearing assembly 95 between support arms 96 which extend across the machine from the side members 34 and 35. At the lower end of the cage 16 a shaft 98 depends therefrom and has a lower portion 99 of reduced diameter disposed in a bearing assembly 100 for rotation relative to a plate 101 which is secured, as by welding, to the base of the frame structure. Thus, the cage 16 has bearing portions journalled at the upper and lower ends in bearing assemblies and is arranged for rotation about a vertical axis.

At the lower end of the cage 16 and spaced from the frame member 91 there is provided an integral upstanding arm member 103 which is connected to the cage frame structure by means of cross members 104 and 105. A sleeve 107, having an arm 108 at one end thereof projecting laterally from the axis of the sleeve, is rotatably journaled in a bearing 109 disposed in the wall of the frame member 91 and in the upper bearing portion 110 of the arm 103. A plate 112 of a clutch assembly 113 is keyed to the sleeve 107 and carries at its outer peripheral portion an annular ring 115 which is made of a friction type material such as brake lining. A second plate 117 of the clutch assembly 113 has a central opening 118 freely receiving a hub portion of the plate 112. The plate 117 also carries an annular ring 120 of brake lining material at its peripheral portion in alignment with the brake lining material 115 of the plate 112. A beveled gear 122 has a central opening 123 into which the body portion of the plate 112 is slidably disposed. Thus, a portion of the beveled gear 122 is disposed between the friction elements 115 and 117 and is arranged to be driven thereby. The plates 112 and 117 are connected by a plurality of bolts 124 which have nuts 125 clamping a spring element 126 between the plate 117 and the nuts. By adjusting the nut on the bolt, the tension of the spring may be regulated to vary the pressure with which the friction elements engage the beveled gears for driving the same.

It will be recognized that, for any speed of rotation of a spool, the lineal speed of the wire being wound thereon will be progressively increased as the effective diameter of the spool increases. To compensate for this, the clutch 113 acts as a slip clutch and winds the wire on the spool only as fast as it is fed upon the pulley 61. Thus, as the bevel gear 122 is rotated, the friction type clutch assembly 113 will cause rotation of the sleeve 117 and its associated arm 108.

The arm 108 of the sleeve 109 is arranged to abut a projecting arm 126 which is secured to the peripheral portion of a plate 127, to which is attached the spool 18 around which the wire is arranged to be wrapped or wound. The spool comprises wire frame end members 129 and 130 connected by the axial frame portion 131. The member 129 is removably secured to the plate 127 while the end member 130 is removably supported by a plate 132. The members 129 and 130 are rotatably journalled on a shaft 134 which is journalled in the bearing 109 in the frame member 91 and in a hub portion of the frame member 92. This shaft has a handle portion 133 which permits quick withdrawal of the shaft from its bearing support. Thus, in removing the loaded spool, it is necessary only to pull the shaft 134 out of its bearing support and the spool 18 will roll onto the floor into an easily accessible position where it may be at once taken away with no danger to the operator.

The bevel gear 122 is rotated by a gear drive which includes a bevel gear 135 in mesh with the gear 122 and keyed to a shaft 136 which is journaled in the frame structure members 104 and 105. At its lower end the shaft 136 is pinned to a gear 138 which is in mesh with an idler gear 139 which in turn is in mesh with a gear 140. The gear 140 has a central opening to receive the shaft 98 of the cage 16 for free rotation therein and has a lower flange portion 141 secured by means of cap screws to the base plate 101 which is rigidly connected to the frame of the machine.

Thus it will be seen that as the cage is rotated the gear 139, which is rotatably journalled on a shaft 143 secured to the cage, will roll around the gear 140 and cause rotation of the gear train which ultimately drives the gear 122 and rotates the spool on which the wire is wound.

The wire is evenly fed onto the spool by means of a guide pulley 145 rotatably journalled on a shaft 146 rigidly secured to the frame members 91 and 92. The shaft 146 is provided with a recess portion 147 and a plurality of guide elements 148 secured thereon provided with slanted side walls defining a pair of spiral paths extending in opposite directions axially on the shaft 146. The pulley 145 has an arm member (not shown) which projects inwardly from its central cylindrical hub portion for following in the spiral path defined by the elements 148, and thus the pulley 145 travels back and forth along the shaft 146 and guides the wire then disposed in the grooves of the pulley over the windup spool 18.

The cage 16 is rotated by means of a bevel gear 150 keyed to the upper cylindrical member 93 of the cage. This bevel gear 150 is in mesh with a second bevel gear 151 keyed to the hub 156a of a sprocket 156. Both the gear 151 and the sprocket 156 are freely rotatable on a shaft 152 journalled in a bearing portion 153 of the frame structure of the machine.

The sprocket 156 carries a chain 157 also trained about a driving sprocket 158 (Figure 3) which is keyed to the main timing shaft 30. As the shaft rotates, the cage is rotated about its vertical axis. It will be seen in Figure 1 that the chain 157 is trained over a guide sprocket 160 freely rotatable on the shaft 59. This guide sprocket 160 prevents the chain 157 from becoming entangled with the mechanism disposed about the shaft 59.

A protecting gate 161 (Figure 1) is mounted on hinges 162 on the frame structure of the machine.

Thus, the cage 16 is mounted for rotation about a vertical axis in the frame structure of the machine and is driven through a chain and gear mechanism directly from the main timing shaft 30 of the machine. Through the series of gears mounted on the cage 16, the storage spool 18 on which the wire is wound is driven by the rotation of the cage 16 itself. The spool 18 is spun end-for-end causing the strands of wire to be twisted around each other as the cage rotates.

*Mechanism for positively feeding the strands of wire 20 and 21 through the barb-attaching station 13*

Referring to Figures 1 and 6, it will be seen that the auxiliary wires 20 and 21 are moved from opposite directions across the barb-attaching station 13. At the barb-attaching station there is disposed a pair of blocks 163 and 164 which are secured, by any suitable means, to the frame structure of the machine. Guide tubes 166 and 167 have end portions disposed in openings in insert members 168 and 169 clamped in recesses of the blocks 163 and 164, respectively, by cover members 170. The guide tubes 166 and 167 have central openings which receive the wires 20 and 21, respectively, and guide them in a downwardly slanted direction across the barb-attaching station. The lower ends of the inserts 168 and 169 have slanted walls to receive the wires and hold them in the downwardly slanted position.

The wires are fed across the barb-attaching station by means of the feed assemblies 22 and 23, respectively. Since these feed devices are substantially identical, it is believed that a description of one of these devices will be sufficient to adequately disclose this feature of the invention.

As seen in Figure 1, the feeding device 22 comprises a feed disk 178 keyed to a shaft 179 which is suitably journalled in a pillow block 180 secured to the frame of the machine. The disk 178 has on its periphery a recessed portion 182 extending substantially entirely around the periphery with the exception of a camming surface 183 which extends above the portion 182 and defines an arcuate gripping surface coacting with a roller 184 rotatably journalled on a shaft 185 in a spring-urged block member 186. The block 186 is slidably disposed in a housing 187 and has a stud 188 threaded on the upper wall thereof. The stud passes freely through an opening in the housing 187 and is provided with a ring 191 which is secured thereon as by brazing. A spring 189 is disposed about the stud 188 between the ring 191 and the inner wall of the housing 187 and is arranged to urge the block 186 downwardly out of the housing 187. A pair of lock nuts 190 are threaded on the end of the stud 188 providing means for rotating the stud to vary the tension of the spring 189. The housing 187 is rigidly secured to a support structure 192 which is secured, as by welding, to the frame of the machine and carries an arm member 193 on which is rotatably disposed a wheel 194 having a central groove 195 extending around the periphery. The wheel 194 is a guide wheel and prevents the wire 20 from sliding sidewise off the disk 178.

It will thus be seen that, as the disk 178 is rotated on the shaft 179, the camming surface 183 will periodically engage a portion of the wire 20 pressing it against the roller 184 to feed the wire positively forwardly as long as the camming surface 183 presses against the wire. In Figure 6, with a clockwise rotation of the disk 178, the end of a feeding cycle is illustrated.

As before mentioned, the feeding device 23 is substantially identical to the feeding device 22 with the exception that the bracket 197 on which the housing portion of the device is mounted does not carry an arm similar to the arm 193 carrying the wheel 194. There is no need for a roller 194 since the wire 21 approaches the feeding device 176 as it travels in a straight line. However, as seen in Figure 1, the wire 21 is disposed around a pulley 199 rotatably disposed on a shaft 200 (Figure 3) journalled between brackets 201 secured to the support structure.

As best seen in Figure 1, the shaft 179 is rotated by means of a chain 202 trained around a sprocket 203 keyed to the shaft 179, and around a sprocket 204 keyed to the main timing shaft 30. The feed disc 205 of the feed device assembly 23 is keyed to the shaft 65 which carries a gear 206 in mesh with a gear 207 keyed to the main timing shaft 30. It will, of course, be understood that the shafts 179 and 65 are rotated at the same speed so that the wires 20 and 21 will be fed an equal distance into the barb-attaching station.

*Mechanism for twisting the strands 20 and 21 around the strands 10 and 11*

Figure 14:
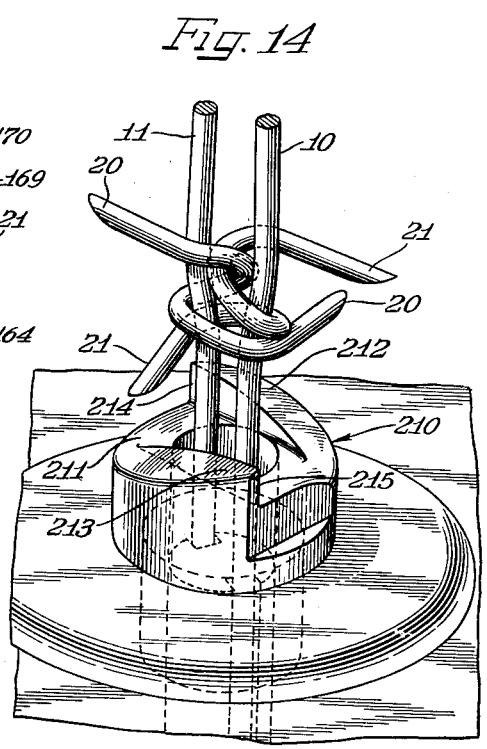
Figure 14 is a perspective view showing the barb-attaching station of the machine of the present invention just after the barb has been twisted and severed and raised away from the barb-attaching station.

The device for twisting the strands 20 and 21 comprises a twister head 210 (Figure 14) including a cylindrical body portion 211 and two oppositely disposed wedge-like twister elements 212 and 213 which are located on the peripheral portion of the head 210. The twister portions have upwardly slanted upper walls and flat inner side walls 214 and 215, respectively.

The twister head 210 is threaded into a recess of a hollow tubular shaft 217 (Figure 6) which is journalled at its upper and lower ends in bearing assemblies 218 and 219, respectively, for rotation about a substantially vertical axis. The shaft 217 is keyed to a worm 220 meshing with a spiral gear 221 keyed to the main timing shaft 30. Thus, the shaft 217 and the twister head 210 are constantly rotated by the main timing shaft 30.

A lock nut 223 is secured on the lower threaded end of the shaft 217 to hold the shaft between the bearing assemblies.

Figure 15:
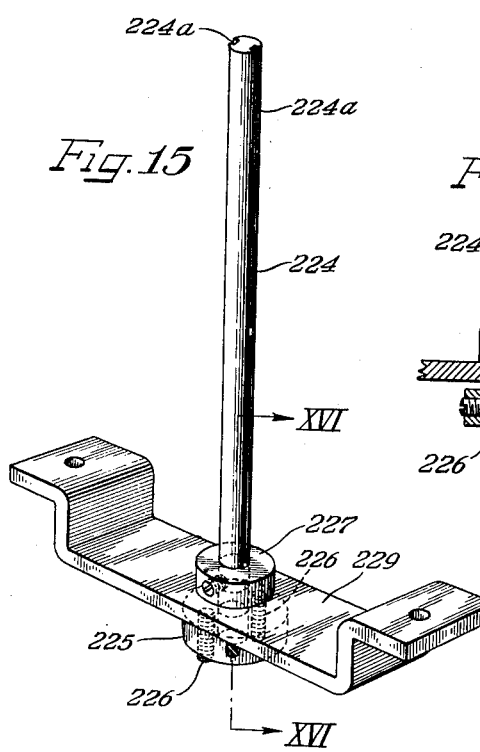
Figure 15 is a detached perspective view of a portion of the barbed wire making machine of Figure 1.
Figure 16:
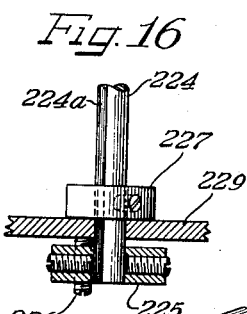
Figure 16 is a fragmentary vertical sectional view taken along the line XVI—XVI of Figure 15.

A rod 224 is freely disposed in the central opening of the tubular rod 217 and has at either side longitudinal grooves 224a (Figure 15) in which are disposed the wires 10 and 11. At its lower end the guide rod 224 carries a plate 225 which is adjustably mounted by means of set screws 226 and a locking plate 227 on a bracket 229 which may be suitably secured to the frame of the machine. The guide rod 224 is therefore held rigidly relative to the frame and extends upwardly through the hollow core of the tubular rotating rod 217.

As seen in Figures 6 and 7, the auxiliary strands 20 and 21 extend across the barb-attaching station 13 in a downwardly slanted direction between the upwardly extending strands 10 and 11. In Figure 7, the initial position of the four strands of wire prior to the twisting of the barbs is illustrated.

As seen in Figures 7, 9, 10, 11 and 12, the twister head 210 is rotating in a counter-clockwise direction. In Figure 7, the initial position is shown, and in Figure 9 the position of the wires is shown after the twister head has rotated 90°. It will be seen that the wall 214 of the twister element 212 has contacted the wire 20 and bent it substantially 90° while the wall 215 of the twister element 213 has contacted the strand 21 and bent it substantially 90°. In Figure 10 substantially 270° of rotation has taken place and the strands 20 and 21 have been wrapped around each other and around the upstanding strands 10 and 11. This position is also shown in elevation in Figure 11. In Figure 12 the twister head has rotated approximately 120° past one full revolution, thus winding each of the strands 20 and 21 about the other strand and about both of the upstanding strands 10 and 11. At this point they are severed by a cutting mechanism to be described hereinafter.

It is to be noted in Figure 11 that the strands 20 and 21 are kept under the slanted edges of the guide blocks 168 and 169 until the twisting operation has begun. Also, after the twisting operation has begun and the twisted wire accumulates around the twister head, it will be cammed upwardly away from the surface of the twister head, as shown in Figure 11. Further, it is to be noted that the wires 10 and 11 will twist slightly during the twisting operation of the strands 20 and 21, and their point of twisting will be governed by the position of the upper end of the guide rod 224. As before mentioned, the position of this guide rod can be regulated by the adjusting screws 226 and the collar 227.

*Cutter mechanism*

The mechanism for severing the strands 20 and 21 to cut the barbs comprises two cutter blades 235 and 236 (Figure 10) having arcuate cutting edges 237 and 238, respectively. These blades are slidable on arcuate guide surfaces 229 and 230 in the blocks 168 and 169. The cutter blades have square shank portions which extend into square holes 232 (Figure 8) in a V-shaped block 233 and are held therein by means of a plurality of set screws 234 threaded into the top of the V-shaped blocks to bear against the shank of the cutter. The block 233 which has a V-shaped groove on its upper surface has a substantially rectangular cross section and is disposed in a groove 239 provided in a bracket 240 secured to the frame of the machine. Plates 241 and 242, secured to the bracket 240 by bolts 244, have a portion overlapping the block 233 thereby to provide a trackway for sliding movement of the block 233. It is also obvious that by loosening the set screws 234 the blades themselves may be adjusted in the block 233.

The cutter blades 235 and 236 are moved forwardly and rearwardly in their cutting stroke by means of a rocker mechanism 245 (Figure 7). This mechanism comprises a lever 246 pivoted substantially at its central portion on a pin 247 which is secured in the frame of the machine and carries at one end a roller 248 mounted for rotation about a pin 249 disposed in the bifurcated end of the lever 246. The roller 248 is arranged to roll along the surface of the gear 221 and periodically ride over a cam member 250 (Figure 8) secured on the gear face. The roller is urged against the surface of the gear 221 by means of a spring 252 disposed about a rod-like projection 253 on the end of the arm 246 and a projection 254 having a shoulder member 255 and a threaded shank 256. The shank 256 is threaded into the end of a support arm 258 secured as by a bolt 259 to the frame of the machine. The spring 252, therefore, is under compression tending to urge the roller 245 against the gear 221. At the opposite end of the lever 246 a pin 260 is threaded into the lever and held therein by a nut 261. A reduced end portion 262 on the pin 260 is arranged to engage in a hole 264 located in the block 233.

Thus, as the roller 245 rides up the cam surface 248, the end of the lever 246 which carries the pin 260 will be pivoted to move the block 233 and the attached cutters 235 and 236 forwardly in their cutting stroke.

*Operation of the machine*

Assume that the machine has been stopped in the position indicated in Figure 1. In this position the indexing pulley 71 is in its uppermost position and the pick-up pulleys 47 and 61 have drawn the wire between the pulleys 45 and 47 taut and the end of the wire is connected around the framework of the take-up spool 18 so that the line between the spool and the wheel 61 is also taut. The machine is ready for the downward indexing movement of the wheel 71 on the arm 75 to move the wire a predetermined distance past the barb-attaching station 13.

Also, in this position the cams on the feed devices 22 and 23 which receive the strands 20 and 21 across the barb-attaching station are just about ready to come into operation so that when the wire is indexed new portions of the strands 20 and 21 will be fed across the twister head between the strands 10 and 11.

When the clutch is engaged and the motor 38 is energized, the shafts 30 and 65 begin to rotate and, due to the eccentric mechanism, the wheel 71 moves downwardly to index the wire through the barb-attaching station, and the feed devices 22 and 23 move a new portion of the strands 20 and 21 across the barb-attaching station. The various other rotating members of the machine are, of course, in motion, the cage 16 and its associated spool winding device are effective to twist and wind the wire around the spool, and the wheels 47 and 61 are in movement to pull the wire around the various guide wheels. The twister head on the shaft 217 is of course being rotated, and it is to be noted that the feeding of the strands 20 and 21 across the barb-attaching station must be so coordinated with the rotation of the tube 217 that they will be slid between the strands 10 and 11 when the side walls 214 and 215 are substantially parallel to the line of movement of the wires, as shown in Figure 7.

As the wheel 71 completes its stroke downwardly and begins its upward movement, the pulleys 47 and 61 rotate to pick up the slack in the wire due to the upward movement of the pulley 71. The wires between the barb-attaching station 13 and the pulley 45 is substantially motionless except for the slight camming action due to the winding of the barb by the twister head.

When the wires 20 and 21 have been wrapped around the vertical wires 10 and 11, the cutter blades, through the lever mechanism 245, are moved forward to sever end sections from wires 20 and 21 by a slanting cut to define sharp pointed barbs.

The mechanism is so coordinated that the wheel 71 will reach its upper position just about the time cutters 235 and 236 sever the wires 20 and 21. Thus, the downward indexing stroke of the wheel 71 will begin just after the barb is severed. A new cycle of operation will then begin to form another barb on the wire.

Figures 17 to 20, inclusive, show the portions of the machine of the present invention which must be rearranged when it is adapted for use in making a two-point barb. Figures 23 is a diagrammatic showing of the path of travel of the strands of wire as they are processed through the machine.

Referring to Figure 23, it is seen that a strand of wire 270 is directed substantially vertically through the barb-attaching station 13, over the guide pulleys 45, 71, 46, 47, 61, 48, 145, and then onto the spool 18. A second strand of wire 273 is directed over a pulley 199a (Figure 3) which is disposed on the shaft 201 and upwardly over the pulley 46 where it proceeds through the machine alongside of the wire 70, which of course carries the spaced barbs.

A barb forming wire 274 is also directed over the pulley 199 and then substantially laterally through the guide tube 167 to the barb-attaching station 13.

It will be understood that this modified machine works exactly the same as the four-point barb forming machine in the manner and mechanism for feeding the wire 270 periodically through the barb-attaching station by means of the indexing pulley 71 and in the means for tensioning the wire between the pulley 45 and the pulleys 47 and 48 and for winding and twisting the wires 270 and 273 around one another in the cage 16.

As seen in Figure 6, the machine is converted from a four-point barb forming machine to a two-point barb forming machine by unfastening the bracket 229 and removing the guide rod 224. The twister head 210 is removed and a two-point twister head 286, Figure 18, is screwed in place. The wire 270 is then threaded through the central opening in the tube 217 and through the twister head 286. Thus, for making a two-point barb wire no special guide rod is required for directing the wire through the barb-attaching station.

Figure 17:
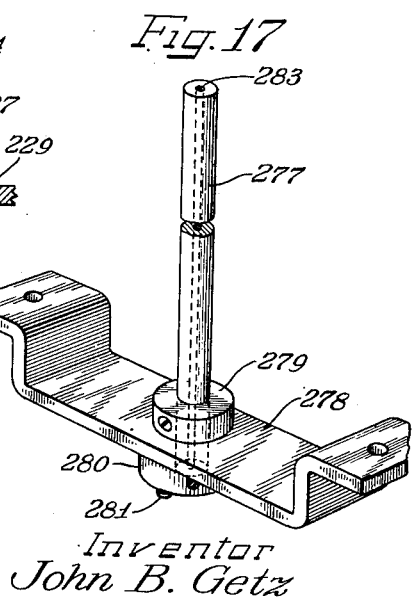
Figure 17 is a perspective view similar to Figure 15 but showing a modified adapted member for use when a two-point barb is made in this machine.

However, if desired, a new guide rod may be inserted in the tube 217. In Figure 17 is shown the guide rod 277 which must be substituted for the guide rod 224 (Figure 15) which is used on the four-point barb forming machine. The rod 277 is adjustably secured in a bracket 278, identical with the bracket 229, by means of an adjustment collar 279 and adjusting plates 280 and cap screws 281.

The rod 277 has one central hole 283 extending longitudinally therethrough and is arranged to receive the single strand of wire 270 and direct it upwardly through the barb-attaching station 13.

It will be noted that only the one wire feeding device 23 is used for a two-point barb forming machine and also that only the one cutter blade 236 is necessary for this machine. The new twister head 286 carries only one twister element 287. In Figure 18, the original position of the strand 274 after it has been fed across the barb-attaching station is illustrated. It is to be noted that the end of the strand 274 is disposed under the slanted surface of the guide blocks 163 for holding the wire in the downward direction during the initial twisting of the wire. In its initial position the wire 274 is introduced between the upstanding wire 270 and the camming flat edge 289 of the twister element. After the twister head has rotated two full turns, the wire 274 is wrapped around the wire 270, as shown in Figure 20. The cutter blade 236 moves forwardly and severs the strand 274 to define the barb.

After the barb is formed, the wire is indexed forwardly a predetermined distance for putting the wire 270 in the correct position for the securement of a new barb. As the wire 270 with the barbs thereon and the plain wire 273 enter the cage, the twisting action of the cage wraps these wires around each other, and when they are disposed on the spool 128 they are in the form of a composite barbed wire.

From the foregoing description it will be seen that there is provided in this invention a novel, compact barbed wire forming machine which employs a novel apparatus for feeding the barb supplying wire to the barb-attaching station, novel means for indexing the barbed wire through the machine, and an efficient means for winding the barbed wire around itself and storing it on a spool. The constant feeding stroke of the indexing mechanism provides a novel means for measuring the amount of wire which is wound on the spool. Due to the positive feeding action of the novel feed device and to the efficient manner in which the barbs are wound around the carrier wire, this machine is substantially free of the common fault of wasting barbs and securing the barbs at unequal distances on the carrier wire.

It will be recognized also that there is described in this specification a novel method of forming barbed wire which includes, among others, the novel steps of intermittently feeding a wire through a barb-attaching station while simultaneously continuously feeding the barbed wire onto a storage spool and twisting the wire as it advances by spinning the spool end-for-end. Also, the method of forming barbed wire by feeding a carrier wire vertically through a barb-attaching station while feeding a barb forming wire horizontally through said station is entirely new in this field.

It will, of course, be understood that various details of construction may be varied through a wide range without departing from the features of this invention, and it is, therefore, not the purpose to limit the patent granted herein otherwise than necessitated by the scope of the appended claims.

I claim as my invention:

1. In a barbed wire machine, a frame, a twister head on said frame having a rotatable tubular body adapted to receive strand forming wires therethrough and being mounted for rotation around a vertical axis, a twister at the top of said body having a pair of lug portions each being formed with an upwardly extending axial face to engage a barb-forming wire to be twisted, said lug portions being further provided with a rearwardly extending slanted end wall portion adjacent each upwardly extending axial face, said slanted end wall portions forming a camming surface to axially advance accumulated barb-forming wire twisted by said twister head, a pair of tubular guide blocks on opposite sides of said twister head, each block being transversely aligned relative to said vertical axis and being arranged to guide a barb-forming wire toward said twister head in a downwardly slanted direction across said twister, said blocks each having arcuate face portions spaced apart from one another and curved substantially transversely of said barb-forming wire, each arcuate face portion arranged to be intersected by the barb-forming wire extending therethrough, a cutter blade having an arcuate cutting edge complementary to said arcuate face portion and slidable thereon to cut the barb-forming wire, said arcuate face portion and said complementary shaped cutter blade coacting to assist in guiding said cutter blade through its cutting stroke and minimizing burring of the barb-forming wire, and rocker means to reciprocate said blades through a cutting stroke past said barb-forming wires.

2. In a barbed wire machine as defined in claim 1, said rocker means more particularly comprising a slidable support member for each cutting blade, a trackway for said support member, a medially pivoted lever arm having a pivot connection at one end with said support member and having a camming surface at the other end thereof, and a continuously rotatable driving cam engaging said driving surface for intermittently reciprocating said slidable support member and its associated cutting blade through a cutting stroke.

3. In a barbed wire machine as defined in claim 2, each of said slidable support members and each corresponding cutting blade having adjustably mated complementary male and female parts, and fasteners between said parts to lock said parts in selected adjusted positions.

JOHN B. GETZ.

References Cited in the file of this patent

UNITED STATES PATENTS

| Number | Name | Date |
|---|---|---|
| 232,831 | Leffler | Oct. 5, 1880 |
| 519,633 | Kilmer | May 8, 1894 |
| 520,459 | Swanbum | May 29, 1894 |
| 608,471 | Miller | Aug. 2, 1898 |
| 705,394 | Emery | July 22, 1902 |
| 711,303 | Fredrick | Oct. 14, 1902 |
| 739,244 | Williams | Sept. 15, 1903 |
| 899,542 | Kitselman | Sept. 29, 1908 |
| 902,152 | Kilmer | Oct. 27, 1908 |
| 954,205 | Randall | Apr. 5, 1910 |
| 1,733,835 | Steenstrup | Oct. 29, 1929 |
| 1,798,898 | Pagliarul | Mar. 31, 1931 |
| 1,821,730 | Sommer | Sept. 1, 1931 |
| 2,053,260 | Blashill | Sept. 8, 1936 |
| 2,082,388 | Getz | June 1, 1937 |
| 2,217,301 | Wennberg | Oct. 8, 1940 |
| 2,218,104 | Brignall | Oct. 15, 1940 |
| 2,330,611 | Nelson | Sept. 28, 1943 |
| 2,501,573 | McLouth | Mar. 21, 1950 |
| 2,509,791 | Swanson | May 30, 1950 |